United States Patent [19]

Kissel

[11] Patent Number: 5,041,486

[45] Date of Patent: * Aug. 20, 1991

[54] SOL/GEL POLYMER SURFACE COATINGS AND GLOSS ENHANCEMENT

[75] Inventor: Charles L. Kissel, Anaheim, Calif.

[73] Assignee: Union Oil Company of California, Los Angeles, Calif.

[*] Notice: The portion of the term of this patent subsequent to Apr. 2, 2008 has been disclaimed.

[21] Appl. No.: 373,401

[22] Filed: Jun. 30, 1989

Related U.S. Application Data

[63] Continuation-in-part of Ser. No. 345,029, Apr. 28, 1989, Pat. No. 5,004,563, which is a continuation-in-part of Ser. No. 305,451, Feb. 1, 1989, Pat. No. 5,004,562.

[51] Int. Cl.$^5$ .............................................. C08L 33/02
[52] U.S. Cl. .................................... 524/377; 524/403; 524/543; 524/556
[58] Field of Search ................ 524/403, 377, 556, 543

[56] References Cited

U.S. PATENT DOCUMENTS 4,464,524  8/1984  Karickhoff .......................... 524/558
4,474,607  10/1984  Goldie et al. ....................... 524/403

Primary Examiner—Joseph L. Schofer
Assistant Examiner—Jeffrey T. Smith
Attorney, Agent, or Firm—Alan H. Thompson; Gregory F. Wirzbicki

[57] ABSTRACT

Gloss in surface coating compositions is increased by admixing a sol or gel containing salt with a polymer and a surface coating paste stock. A novel surface coating composition containing a polymer and salt homogeneously distributed in the composition is prepared from the sol or gel and has increased specular gloss compared to a composition without the admixed sol or gel.

102 Claims, No Drawings

SOL/GEL POLYMER SURFACE COATINGS AND GLOSS ENHANCEMENT

RELATED APPLICATIONS

This application is a continuation in part application of U.S. patent application Ser. No. 345,029 filed Apr. 28, 1989, now U.S. Pat. No. 5,004,563, which is a continuation-in-part application of U.S. patent application Ser. No. 305,451 filed Feb. 1, 1989 now U.S. Pat. No. 5,004,562.

BACKGROUND OF THE INVENTION

The present invention relates to sol or gel compositions capable of enhancing the gloss of paints and particularly semi-gloss latex paints.

References to paints and surface coating compositions are often used interchangeably; however, paints are usually used to describe pigmented materials as distinct from clear surface coatings such as lacquers or varnishes. The purposes of paint and surface coatings are aesthetic and/or protective. A coating can enhance the appearance of a substrate in terms of colour and gloss as well as give protection against such problems as weathering or corrosion.

In terms of appearance, particularly gloss properties, paints can be divided into three basic categories, namely, (1) flat paints having a specular gloss of less than about 15 percent reflectance, (2) semi-gloss paints having a specular gloss of about 35 to about 50 percent reflectance, and (3) high-gloss paints having a specular gloss greater than about 70 percent reflectance based upon light having about a 60° angle of incidence. Oil-base paints can easily be formulated into these three categories of paints. However, it is difficult to formulate waterborne paints, particularly water-dispersible (latex) paints having a high specular gloss. The inability to readily formulate semi-gloss and high-gloss latex paints is a significant drawback since oil-base paints are being phased out due to environmental restrictions limiting the volatile organic compounds (VOC) content of paints.

SUMMARY OF THE INVENTION

The present invention involves a method for enhancing the gloss property of a surface coating composition, including a paint composition. A sol or gel composition containing a salt is added to a polymer composition, or to a surface coating or paint composition containing a polymer, or to a surface coating precursor composition containing a polymer, to produce a product surface coating or paint composition having an enhanced gloss property. The salt in the sol or gel composition is contained in sufficient amount to increase the specular gloss, usually by at least about 2 percent reflectance, based upon light having about 60° angle of incidence.

The invention also involves a surface coating composition comprising a polymer binder and a salt homogeneously distributed in the composition. The surface coating composition, particularly a waterborne surface coating composition, comprises a sol or gel composition containing a gloss-enhancing amount of salt, at least one water-soluble or water-dispersible polymer binder, and usually a paste stock containing such ingredients as pigments, coalescing aids, thickening aids, dispersing aids, defoamers, biocides, and fillers.

The surface coating compositions of the invention prepared from the sol or gel composition and polymer are applied to several substrates. The resultant dried surface coating compositions and the coated substrates formed therefrom provide compositions having enhanced gloss properties compared to compositions not prepared with sol or gel compositions. Such compositions and coated substrates of the invention retain adequate scrub and wet adhesion properties while gloss is enhanced.

DETAILED DESCRIPTION OF THE INVENTION

The present invention involves a method for enhancing the gloss property of a surface coating composition, including paint composition. The method includes the step of admixing a sol or gel composition containing a salt with a composition containing a polymer to produce a product admixture composition. The salt is contained in the sol or gel composition in a sufficient concentration to increase the gloss property of a surface coating composition derived from the product admixture composition. The product admixture composition can be either the product surface coating composition or a precursor to the product surface coating composition. The method includes the step of blending the product admixture composition with a surface coating paste stock to provide a product surface coating or paint composition having an improved gloss property compared to one prepared without introducing the salt into the surface coating composition by addition of a salt-containing sol or gel composition.

Copending U.S. patent application Ser. No. 305,451, filed Feb. 1, 1989, by the present inventor and incorporated herein by reference in its entirety, describes, salt-containing sol or gel compositions having a pH less than about 4.0 and their method of preparation, and the admixing of the sol or gels with polymers to produce product admixture compositions which are stable and noncoagulated. In addition to a salt, the sol or gel compositions usually contain a nonaqueous solvent, a stabilizer and, optionally, an acidic component. The solvent is typically an ether, ester, alcohol or combinations thereof, the stabilizer is either a chelator, such as a hydrocarboxylic acid, or a nonionic surfactant, and the acidic component is a protic acid such as nitric acid. The salt must be capable of (1) existing as colloidal salt particulates, (2) existing in ion species or (3) forming ions when dispersed in a composition containing a latex polymer. In the formation of a sol or gel, the salt contains cations or anions capable of being dispersed in the admixture of solvent and stabilizer. In one embodiment for preparing the sol or gel containing a solvent, stabilizer, salt and acidic component, the ingredients are admixed at room temperature and slowly heated to a temperature in the range from about 35° C. to about 85° C., for a period sufficient to produce a transparent product, ordinarily from about 0.5 to about 15 hours, and having the color of the characteristic anion or cation of the particular salt in the admixture. The transparent product is a sol or gel composition containing the cations and anions and/or colloidal salt particulates of the particular salt of the admixture. At least one cation and/or at least one anion of the salt is dispersed in the dried resultant latex polymer/salt composition. Although the invention is not bound by any theory, it is believed that at least some of the particulates derived from the starting salt exists as colloidal salt particulates dispersed in the resultant latex polymer/salt composition. Although all polymers, including water-soluble polymers, such as water-soluble resins, are contemplated in the present invention, a suitable polymer is a nonconjugated polymer such as a water-dispersible polymer (particularly latex) disclosed in the aforementioned copending application Ser. No. 305,451. Polymer concentrations in compositions containing a starting latex polymer, particularly those with dispersions in aqueous media, are ordinarily greater than about 0.1 weight percent of the composition. Usually the concentrations are greater than 1 weight percent and preferably greater than 5 weight percent, but most commonly in the range from about 40 to 70 percent for those latexes resulting from emulsion polymerization. An intermediate mixture of salt, stabilizer and solvent is heated to prepare a sol or gel which is typically mixed with a starting latex polymer to produce a product admixture containing the salt and latex polymer.

The invention encompasses surface coating compositions which have a continuous and discontinuous phase. The invention is directed to a waterborne surface coating composition wherein the continuous water phase contains a binder comprising a water-soluble polymer, and, more particularly, to waterborne surface coating compositions wherein the discontinuous phase comprises a water-dispersible polymer binder, such as a latex. The discontinuous phase of the surface coating compositions of the invention also contains salt components of the sol or gel compositions described herein and typically a paste stock usually containing one or more of the following components: a pigment, an extender pigment, a coalescing aid, a thickening aid, a dispersing aid, a protective colloid, a defoamer, a biocide, an amine solubilizer, a flow additive, a drier, a cosolvent and a filler material. The waterborne coating compositions of the invention contain water, the sol or gel compositions described herein, usually a paste stock and either water-soluble polymers such as water-soluble resins, alkyds, polyurethanes, unsaturated polyesters, and the like, or water-dispersible polymers such as latex polymers.

Although the invention is not bound by any theory, it is believed that at least some of the particulates derived from the starting salt contained in the sol or gel exists as anions or cations of the salt or colloidal salt particulates, the derived particulates being homogeneously distributed in the resultant polymer/salt composition comprising the surface coating composition of the invention. In contrast to conventional surface coating compositions containing dispersed salts from a paste stock (including ground pigments comprising salts, i.e., salt pigments), which are ordinarily capable of settling over time, the salt components introduced into the surface coating compositions of the invention by means of the sol or gel compositions are continuously and permanently distributed throughout the surface coating composition, or a precursor thereof, so as to be homogeneously distributed in the product composition. The term "homogeneously distributed" as used herein, refers to those arrangements and distributions of salt components (whether cations, anions or colloidal salt particulates) derived from the sol or gel composition being closer to the homogeneity and permanence existing in a true solution (wherein a salt is completely dissolved in water and permanently maintained in such a phase) than that in surface coating compositions containing conventional ground dispersed salt pigments. The finely ground conventional dispersed paint pigment or other additive comprising a salt are considered herein to be heterogeneously distributed in a surface coating composition. When viewing the distribution of salt components in surface coating compositions with visibility aids weaker than the ultra microscope, the homogeneity of the salt components of the compositions of the invention is better than that for the ground pigment salts, and the like, of conventional surface coating compositions. In the present context, the distribution and arrangement of butterfat particles in homogenized milk, when viewed through a magnifying glass, is considered homogeneous.

Although any polymer binder compatible with the salt components of the sol or gel compositions described herein may be utilized in a surface coating composition of the invention, water-dispersible polymers are preferred. In a preferred embodiment, a typical polymerization process yields an emulsion comprising a latex polymer and water. However, the emulsion can further comprise a surfactant, a chain transfer agent, catalysts, and activators.

The emulsion in combination with the salt-containing sol or gel compositions described herein (i.e., product admixture composition) can be used to replace at least a portion of the polymer binder used in a waterborne surface coating composition, such as a water-base paint composition containing a latex polymer. A typical surface coating or paint composition comprises an emulsion containing a polymer binder, salt (from a sol or gel) which is homogeneously distributed therein, at least one pigment, a coalescing aid, a thickening aid, a dispersing aid, a defoamer, a biocide, and a filler. Coalescing aids, thickening aids, dispersing aids, defoamers, biocides and fillers suitable for use in surface coating paint compositions are well known to those skilled in the art. Exemplary polymer binders include, but are not limited to, resins, vinyl acrylic polymers, acrylic polymers, vinyl chloride acrylic polymers, styrene/butadine copolymers, styrene/acrylate copolymers, and vinyl acetate/ethylene copolymers. Also included are those polymers disclosed in the aforementioned copending application Ser. No. 305,451. Generally, up to about 30 weight percent of the solid content of the polymer binder can be replaced by the product admixture composition of the invention. Usually, the product admixture composition replaces about 1 to about 30 weight percent of the polymer binder's solid content. Preferably, from about 5 to about 25, and more preferably from about 10 to about 20 weight percent of the solid content of the polymer binder is replaced by the product admixture composition. Paint compositions suitable for use in conjunction with the product admixture composition typically have a pigment volume concentration (pvc) of less than about 25 volume by volume percent (v/v%). Preferably, the paint composition has a pvc of about 15 to about 25 v/v%.

In addition to a polymer binder and a sol or gel composition containing a salt, the surface coating composition of the invention contains a surface coating paste stock. The paste stock, particularly a paste stock suitable in combination with a water-dispersible polymer, usually contains at least one pigment and usually at least one of the aforementioned additives such as a coalescing aid, a thickening aid, a defoamer, a biocide and/or a filler material or extender. Copending U.S. patent application Ser. No. 345,029, filed Apr. 28, 1989, by the present inventor and incorporated herein by reference in its entirety, describes compounding ingredients for use during blending with a product admixture composition. In the present invention, a waterborne coating composition containing a water-soluble polymer binder and water usually contains a surface coating paste stock containing at least one pigment and usually at least one additive such as a pigment dispersant, an amine solubilizer, a flow additive, a drier, and/or a cosolvent. Conventional ground pigments useful herein include titanium dioxide; copper carbonate; manganese dioxide; lead, zinc and boron chromates; cadmium sulphide; iron oxides; Prussian blue; cobalt blue; ultramarine; chromium oxide; cadmium selenide; red lead; chrome lead; zinc oxide; antimony oxide and lead or calcium carbonate. The salt components derived from the sol or gel composition described herein can also comprise all or a part of the pigment contained in the surface coating composition. As disclosed in the aforementioned copending U.S. application Ser. No. 305,451, several salts contained in the sol or gel compositions provide either color or colorless compositions. For instance, aluminum acetate sol is yellow, aluminum nitrate sol is colorless, cupric acetate is blue, cobalt acetate is red, neodymium chloride is yellow-green, ferric citrate is brown, etc.

Aside from providing color or lack thereof to a surface coating composition, the salt contained in the sol or gel provides an enhancement to the gloss property of the composition. Such enhancement is particularly effective for the gloss property of a semi-gloss or high-gloss paint composition.

Several of the salts contained in the sol or gel compositions, as described in the aforementioned U.S. application Ser. No. 305,451, are utilized to prepare the surface coating compositions of the invention. Particularly useful salts for the surface coating compositions include the acetates, citrates, nitrates and halides of ammonium, silver, aluminum, boron, calcium, cadmium, cerium, cobalt, chromium, cesium, copper, dyprosium, europium, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, yttrium, bismuth, gallium, neodymium, rubidium and terbium. Preferred salts include the acetates of ammonium, aluminum, calcium, chromium, cobalt, copper, dyprosium, lead, lithium, magnesium, potassium, praseodymium, silicon, silver, sodium, uranium, zinc, tetraethylammonium bromide, ferric citrate, and yttrium nitrate. Highly preferred salts contain a rare earth metallic cation, more particularly a lanthanum-containing salt such as lanthanum acetate, lanthanum chloride, lanthanum nitrate and lanthanum oxide, or silicon-containing salts, such as silicon acetate.

In one embodiment of the invention, a sol or gel containing a salt is admixed with a polymer such as a resin. The product admixture composition is blended with a surface coating paste stock to produce a water-soluble surface coating composition. In a preferred embodiment, the salt-containing sol or gel is admixed with a latex polymer, water and a surface coating paste stock to produce a water-dispersible surface coating composition. The product coating compositions have enhanced gloss properties and such salt addition does not substantially reduce the scrub or wet adhesion properties of the compositions.

The surface coating paint composition can be applied to at least a portion of a surface of a substrate. When applied to a substrate having a white glossy surface, the surface coating or paint, upon drying, forms a composition that typically has a specular gloss of at least about 35 percent reflectance, and preferably at least about 70 percent reflectance, when measured at an angle of incidence of about 60°. A commercially available substrate having a white, glossy surface is Form WB grade plain white charts available from Leneta Company of Ho-Ho-Kus, N.J. In the method of the invention, sufficient salt (i.e., a gloss-enhancing amount of salt) is incorporated into the sol or gel composition and/or sufficient sol or gel containing salt is admixed with a composition containing a polymer and/or a paste stock in an amount to increase the specular gloss by at least about 2 percent reflectance, based upon light having about a 60° angle of incidence, as compared to the same surface coating composition without containing the salt from the sol or gel composition. Since specular gloss is directly proportional to the percent reflectance at a given angle of incidence, it is preferred that the percent reflectance obtained by the composition be at least about 35, and more preferably at least about 45 for semi-gloss paints. The percent reflectance for high-gloss paints should be at least about 70, and preferably at least about 75. Accordingly, the sol or gel composition or product admixture composition of the instant invention is capable of enhancing the specular gloss of a paint.

A gloss-enhancing amount of the salt is homogeneously distributed in the surface coating composition of the invention or its precursor by means involving admixing a sol or gel composition containing sufficient salt with a composition containing a polymer and ordinarily also with a surface coating paste stock. In general, the concentration of salt homogeneously distributed in the surface coating composition is about 0.05 and about 5 weight percent. Typically the concentration of sol or gel composition in the surface coating composition which is necessary to achieve such salt concentrations is usually about 0.1 to about 2 weight percent. Furthermore, the concentration of salt in the sol or gel composition is usually about 2 to about 50, preferably about 10 to about 20 weight percent. Moreover, when the sol or gel composition is first admixed with a composition containing a polymer to produce a product admixture composition prior to blending with a surface coating paste stock, the concentration of the sol or gel in the product admixture composition is usually about 2 to about 20 weight percent, and the concentration of the salt (from the sol or gel composition) in the product admixture composition is ordinarily about 0.5 to about 25 weight percent.

The surface coating compositions of the invention are applied to the surface of a solid substrate such as wood, metal, ceramic, plastic, glass, paper, cement, combinations thereof, and the like, or applied to such substrates over a previously coated surface. The applied surface coating composition of the invention is dried by suitable methods known in the art to produce a dried, resultant coating composition containing a coalesced polymer and salt components derived from the sol or gel composition.

The resulting coated substrate comprising any solid substrate and the dried resultant surface coating composition of the invention has a dried resultant surface coating having an enhanced gloss property compared to a comparable coating composition not prepared with the sol or gel composition described herein. Either a coated substrate comprising any solid substrate and the dried resultant surface coating composition or the surface coating composition may contain a controlled quantity of sol or gel composition and/or salt contained therein so as to have controlled opacity and/or color and other visual effects.

The resulting coated substrates produced by the combination of the dried resultant coating composition and the solid substrate upon which the surface coating composition of the invention is at least partially applied also depend upon the reaction between the coating composition of the invention and the particular substrate that is coated. The dried resultant coating composition of the invention in a coated substrate comprising a wood-containing substrate contains tannin blocking properties effective for reducing the weathering of the wood. The dried resultant surface coating composition of the invention contained as a portion of a coated substrate comprising a corrosion-prone substrate (i.e., a metal-containing or plastic-containing substrate) has a corrosion-reducing or corrosion-inhibiting property.

The invention is further illustrated by the following examples which are illustrative of specific modes of practicing the invention and are not intended as limiting the scope of the invention defined by the appended claims.

EXAMPLE 1

A 1-liter kettle is charged with 50 g lanthanum nitrate, 246 g ethylene glycol, 166 g citric acid/ and 15 ml (21.4 g) concentrated nitric acid. The mixture is heated at 50° C. for 6 hours, and then cooled to room temperature. The clear, straw colored sol had a pH <0.1 and a Brookfield viscosity 226 cps. The sol contains about 10 weight percent of the lanthanum nitrate salt. Various other sols are prepared in the same manner. These sols are blended with vinyl acrylic latex (76 RES 3077, available from Unocal Chemicals Division, Schaumburg, Ill.). For each 75 g latex, 2.6 g sol is used, i.e., about 3.35 weight percent of sol in the latex. The sol/latex product admixture is then made into formulated paint useful for semi-gloss architectural coatings applications.

The following materials are blended at 400 rpm using a 4-inch Cowels blade: 1845 g water, 610 g 1,3-propylene glycol, 31 g Natrasol 250HR, 8.9 colloid 681-F, 70.9 g Tanol 731, 26.6 g Igepal C0630, 8.9 g phenylmercuric acetate, and 2215 Tronox CR800. The blend is then ground at 1800 rpm for 2 hours to achieve a grind gauge value of 7NS. The material is cooled to room temperature and the following ingredients are added at 400 rpm: 117 g Texanol, 17.7 colloid, 681-F, and 886 g water. The resulting material is a paste stock for paint.

The formulated paint is prepared using 124.3 g paste stock, 75.3 g sol/latex, and 0.38 g Triton GR-5. These ingredients are blended at 400 rpm for 20 minutes.

EXAMPLE 2

Determination of Gloss Values for Compounded Sol/Latex Paints

Plain white Leneta Charts Form WB (Leneta Company, Ho-Ho-Kus, N.J.) is coated with compounded paints from Example 1 using a 6 mil drawdown bar (Gardner, Bethesda, Md.). The panels are air dried under controlled conditions for 1 week under conditions including 50% humidity and 73° F. The gloss readings in the following Table A are made using a 60° Glossgard II meter (Gardner, Bethesda, Md.).

TABLE A

| Salt Used in Sol | Gloss Percent Reflectance* |
|---|---|
| blank (w/o sol) | 63 |
| none (sol w/o salt) | 64 |
| aluminum acetate | 72 |
| ammonium acetate | 74 |
| antimony ethyleneglycoxide | 67 |
| barium acetate | 64 |
| cadium acetate | 69 |
| calcium acetate | 70 |
| cerium acetate | 67 |
| chromium acetate | 71 |
| cobalt acetate | 72 |
| cupric acetate | 72 |
| dyprosium acetate | 71 |
| ferric acetate | 75 |
| lanthanum acetate | 72 |
| lanthanum chloride | 69 |
| lanthanum nitrate | 74 |
| lanthanum oxide | 70 |
| lead acetate | 72 |
| lithium acetate | 73 |
| magnesium acetate | 70 |
| magnesium nitrate | 68 |
| nickel acetate | 72 |
| potassium acetate | 73 |
| praseodymium acetate | 71 |
| silicon acetate | 70 |
| silver acetate | 76 |
| sodium acetate | 73 |
| strontium acetate | 68 |
| tetraethylammonium bromide | 75 |
| thorium nitrte | 68 |
| titanium isopropoxide | 67 |
| uranium acetate | 71 |
| yttrium acetate | 65 |
| yttrium nitrate | 71 |
| zinc acetate | 73 | scale: higher numbers are better
*Readings of gloss are ±(1-2)

The data summarized in Table A indicate that enhanced gloss is found in compositions employing salt-containing sols in the compounded latex paints.

EXAMPLE 3

Scrub Performance of Compounded Sol/Latex Paints

Black scrub test panels (Leneta, Ho-Ho-Kus, N.J.) Form P-121-10N are coated with compounded paints from Example 1 using a 6 mil drawdown bar (Gardner, Bethesda, Md.). The panels are dried 1 week at 73° F. and 50% humidity. The scrub performance is determined in accordance with the procedure of ASTM D2486-79 using a straight line washability and abrasion machine (Model MA1492, Gardner, Bethesda, Md.) and standard scrub medium SC-2, abrasive type (Leneta, Ho-Ho-Kus, N.J.).

TABLE B

| Salt Used in Sol | Average Cycles to Failure* |
|---|---|
| blank (w/o sol) | 2500 |
| none (sol w/o salt) | 2650 |
| aluminum acetate | 2250 |
| ammonium acetate | 2300 |
| antimony ethyleneglycoxide | 2400 |
| barium acetate | 2200 |
| cadium acetate | 2300 |
| calcium acetate | 2350 |
| cerium acetate | 2200 |
| chromium acetate | 2350 |
| cobalt acetate | 2200 |
| cupric acetate | 2200 |
| dyprosium acetate | 2450 |
| ferric acetate | 2250 |
| lanthanum acetate | 2650 |
| lanthanum chloride | 2700 |
| lanthanum nitrate | 2650 |

TABLE B-continued

| Salt Used in Sol | Average Cycles to Failure* |
| --- | --- |
| lanthanum oxide | 2700 |
| lead acetate | 2300 |
| lithium acetate | 2400 |
| magnesium acetate | 2400 |
| magnesium nitrate | 2400 |
| nickel acetate | 2300 |
| potassium acetate | 2450 |
| praseodymium acetate | 2300 |
| silicon acetate | 2650 |
| silver acetate | 2450 |
| sodium acetate | 2400 |
| strontium acetate | 2450 |
| tetraethylammonium bromide | 2100 |
| thorium nitrate | 2700 |
| titanium isopropoxide | 2200 |
| uranium acetate | 2450 |
| yttrium acetate | 2350 |
| yttrium nitrate | 2300 |
| zinc acetate | 2400 |

*Scrub measurements are ±150 cycles at 2500 total cycles; so 2300 and 2400 are the same.

The summarized data in Table B suggest scrub is slightly depressed by the addition of sols, except for lanthanum, silicon and thorium salt-containing sols, which do not affect the normal scrub.

EXAMPLE 4

Wet Adhesion Performance of Compounded Sol/Latex Paints

Plain white Leneta Charts Form WB (Leneta Company, Ho-Ho-Kus, N.J.) are coated with black enamel paint (such as interior/exterior 54-309 from Pittsburgh Paints, Pittsburgh, Pa.) prepared from sols in the same manner as in Examples 1 and 2 while using a 10 mil drawdown bar (Gardner, Bethesda, Md.), and dried for 1 week at 73° F. and 50% humidity. The wet adhesion performance is determined using the wet pick and peel procedure of ASTM D3359-83.

TABLE C

| Salt Used in Sol | Wet Adhesion Rub/Peel* |
| --- | --- |
| blank (w/o sol) | 3/2 |
| none (sol w/o salt) | 3/2 |
| aluminum acetate | 3/2 |
| ammonium acetate | 5/2 |
| antimony ethyleneglycoxide | 3/2 |
| barium acetate | 3/2 |
| cadium acetate | 3/2 |
| calcium acetate | 3/2 |
| cerium acetate | 4/3 |
| chromium acetate | 3/2 |
| cobalt acetate | 3/2 |
| cupric acetate | 3/2 |
| dyprosium acetate | 5/3 |
| ferric acetate | 3/2 |
| lanthanum acetate | 4/3 |
| lanthanum chloride | 4/2 |
| lanthanum nitrate | 4/3 |
| lanthanum oxide | 4/2 |
| lead acetate | 3/2 |
| lithium acetate | 4/2 |
| magnesium acetate | 3/2 |
| magnesium nitrate | 3/2 |
| nickel acetate | 3/2 |
| potassium acetate | 4/2 |
| praseodymium acetate | 4/3 |
| silicon acetate | 5/3 |
| silver acetate | 3/2 |
| sodium acetate | 4/2 |
| strontium acetate | 3/2 |
| tetraethylammonium bromide | 4/2 |
| thorium nitrate | 3/2 |

TABLE C-continued

| Salt Used in Sol | Wet Adhesion Rub/Peel* |
| --- | --- |
| titanium isopropoxide | 3/2 |
| uranium acetate | 3/2 |
| yttrium acetate | 5/2 |
| yttrium nitrate | 4/3 |
| zinc acetate | 3/2 |

*Subjective scale: 5 = best, 1 = worst

From the above data summarized in Table C, inorganic and organic nitrogen salts, lanthanide salts, silicon salts, and alkali-metal salts enhance wet adhesion in compounded latex paints.

EXAMPLE 5

Gloss, Scrub and Wet Adhesion Performance of Lanthanum Sol-Containing Compounded Latex Paints as a Function of Lanthanum Concentration The compounded paint of Example 1 (containing 10 weight percent sol in latex which is 3.35 weight percent lanthanum nitrate in the sol/latex) along with other lanthanum nitrate sols containing different amounts of lanthanum nitrate at the same and other sol/latex weight ratios are evaluated for scrub, gloss and wet adhesion as described in Examples 2, 3 and 4.

TABLE D

| Weight Percent of Lanthanum Nitrate In Sol | Weight Percent of Lanthanum Nitrate In Sol/Latex | Gloss (60°) Percent Reflectance | Scrub | Wet Adhesion |
| --- | --- | --- | --- | --- |
| 0 | 0 | 63 | 2500 | 3/2 |
| 5 | 0.85 | 65 | 2500 | — |
| 5 | 1.67 | 68 | 2300 | 3/2 |
| 5 | 3.35 | 70 | 2200 | 3/2 |
| 10 | 1.67 | 72 | 2500 | 2/2 |
| 10 | 3.35 | 74 | 2650 | 4/3 |
| 10 | 6.70 | 75 | 2650 | 4/3 |
| 20 | 3.35 | 75 | 2650 | 4/3 |
| 20 | 6.70 | 75 | 2650 | 4/3 |
| 20 | 10.1 | 75 | 2650 | 4/3 |

At 5 weight percent salt in the sol, higher levels of salt in the paint can improve gloss, but can detrimentally affect scrub performance due to the accompanying addition of ethylene glycol and citric acid. A similar impact on wet adhesion is shown, because water sensitivity is also increased. Table D also shows that an increase of salt content in the sol provides better gloss, scrub and wet adhesion properties accompanying the reduced amount of ethylene glycol and citric acid in the paint.

EXAMPLE 6

Performance of Compounded Latex Paints Containing Commercial Lanthanum Nitrate Sols The method of Example 1 is used to prepare sols from commercial quality lanthanum nitrate (obtained from Molycorp, Washington, Pa.). The sols are used to prepare paints as in Example 1, and then tested as described in Examples 2, 3 and 4.

TABLE E

| Paint Sample No. | Contained in Lanthanum Nitrate Weight Percent Impurities | Gloss (60°) Percent Reflectance | Scrub | Wet Adhesion |
| --- | --- | --- | --- | --- |
| 1 | 4% Ce, 8% Nd, | 73 | 2550 | 4/3 |

TABLE E-continued

| Paint Sample No. | Contained in Lanthanum Nitrate Weight Percent Impurities | Gloss (60°) Percent Reflectance | Scrub | Wet Adhesion |
| --- | --- | --- | --- | --- |
| | 3% Pr | | | |
| 2 | 0.3% Ce, 9.5% Nd, 3.2% Pr | 73 | 2600 | 4/3 |
| 3 | 20% Ce, 4.% Nd, 1.5% Pr | 73 | 2400 | 4/3 |
| 4 | <0.5%, unspecified (Lab Quality) from Example 1 | 74 | 2650 | 4/3 |

The data in Table E indicate that commercially available impure lanthanum nitrate utilized in paint samples 1, 2 and 3 provide essentially the same gloss, scrub and wet adhesion properties as that for Sample 4 containing a lab quality sample of lanthanum nitrate (<0.5 wt. % of unspecified impurities) in the sol and paint sample.

In view of the foregoing description of the invention including the examples thereof, it is evident that many alternatives, modifications, and variations can be made by those skilled in the art without departing from the concept of the present invention Accordingly, it is intended in the invention to embrace all such alternatives, modifications, and variations as may fall within the scope of the appended claims.

I claim:

1. A surface coating composition comprising a latex of a polymer and salt components in the form of anions, cations and colloidal salt particulates, said salt components derived from a salt-containing sol or gel composition having a nonaqueous solvent.

2. The composition defined in claim 1 wherein said polymer comprises about 40 to about 70 weight percent of said latex.

3. The composition defined in claim 1 further comprising a surface coating paste stock containing one or more components selected from the group consisting of a pigment, an extender pigment, a coalescing aid, a thickening aid, a dispersing aid, a protective colloid, a defoamer, a biocide, an amine solubilizer, a flow additive, a drier, a cosolvent and a filler material and said sol or gel composition having a pH less than about 4.0.

4. The composition of claim 3 wherein said paste stock comprises at least one pigment.

5. The composition defined in claim 3 wherein said paste stock comprises a coalescing aid.

6. A composition defined in claim 3 wherein said paste stock comprises a thickening aid.

7. The composition defined in claim 3 wherein said paste stock comprises a dispersing aid.

8. The composition defined in claim 3 wherein said paste stock comprises a defoamer.

9. The composition defined in claim 3 wherein said paste stock comprises a biocide.

10. The composition defined in claim 1 wherein the specular gloss is increased at least about 2 percent reflectance, based upon light having about a 60° angle of incidence, as compared to said composition without said salt.

11. The composition defined in claim 1 wherein said salt comprises a rare earth metallic cation.

12. The composition defined in claim 1 wherein the concentration of said salt in said sol or gel composition is about 2 to about 50 weight percent.

13. The composition defined in claim 1 wherein the concentration of salt in said coating composition is about 0.05 to about 5 weight percent.

14. The composition defined in claim 12 wherein the concentration of sol or gel composition in said coating composition is about 0.1 to about 2 weight percent.

15. The composition defined in claim 1 wherein said latex of a polymer is selected from the polymer group consisting (1) conjugated diolefin polymers containing one or more conjugated diene monomers having 4 to 8 carbon atoms,
  (2) olefin-ester interpolymers containing a monoolefin monomer having up to 4 carbon atoms and an alkenyl or alkenol ester of a saturated carboxylic acid,
  (3) olefinically unsaturated carboxylic acid ester polymers containing polymerized, olefinically unsaturated monomers containing polymerized olefinically unsaturated carboxylic acid ester monomers,
  (4) polymers of olefinically unsaturated monomers containing alkenyl ether monomer units,
  (5) polymers of vinylidene chloride or vinyl chloride with or without other polymerized, olefinically unsaturated monomers, and
  (6) combinations thereof.

16. The composition defined in claim 1 wherein said salt comprises lanthanum or silicon.

17. The composition defined in claim 1 wherein said salt is selected from the group consisting of the acetates, citrates, nitrates and halides of ammonium, silver, aluminum, boron, calcium, cadmium, cerium, cobalt, chromium, cesium, copper, dyprosium, europium, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, yttrium, bismuth, gallium, neodymium, rubidium and terbium.

18. The composition defined in claim 1 being a loss or high-gloss paint composition.

19. A surface coating composition comprising:

(1) a product admixture composition comprising (a) a sol or gel composition containing a salt in the form of cations, anions and colloidal salt particulates and having a pH less than about 4.0 and (b) a latex of a polymer, said salt in sufficient amount to enhance the gloss property of said surface coating composition as compared to the same surface coating composition which does not contain said sol or gel composition, and
  (2) a surface coating paste stock containing one or more components selected from the group consisting of a pigment, an extender pigment, a coalescing aid, a thickening aid, a dispersing aid, a protective colloid, a defoamer, a biocide, an amine solubilizer, a flow additive, a drier, a cosolvent and filler material.

20. The surface coating composition defined in claim 19 being a waterborne surface coating composition wherein said sol or gel composition comprises an organic solvent and a stabilizer.

21. The waterborne surface coating composition defined in claim 20 further comprising at least one pigment.

22. The waterborne surface coating composition defined in claim 20 wherein said surface coating paste stock comprises pigment salt particulates of diameter greater than 40 nanometers.

23. The waterborne surface coating composition defined in claim 20 further comprising a coalescing aid.

24. The waterborne surface coating composition defined in claim 20 further comprising a thickening aid.

25. The waterborne surface coating composition defined in claim 20 further comprising a dispersing aid.

26. The waterborne surface coating composition defined in claim 20 further comprising a defoamer.

27. The waterborne surface coating composition defined in claim 20 further comprising a biocide.

28. The waterborne surface coating composition defined in claim 22 further comprising:
   (a) a coalescing aid,
   (b) a thickening aid,
   (c) a dispersing aid,
   (d) a defoamer,
   (e) a biocide, and
   (f) a filler.

29. The waterborne surface coating composition defined in claim 19 wherein said polymer comprises about 40 to about 70 weight percent of said latex.

30. The surface coating composition defined in claim 19 further comprising water, a surface coating paste stock and sufficient salt in said sol or gel composition to increase the specular gloss by at least about 2 percent reflectance, based upon light having about a 60° angle of incidence, as compared to the same composition, but not containing said sol or gel composition.

31. The surface coating composition defined in claim 19 wherein said salt comprises a rare earth metallic cation.

32. The waterborne surface coating composition defined in claim 21 wherein said salt is homogeneously distributed in said composition.

33. The surface coating defined in claim 19 wherein the concentration of said salt in said coating composition is about 0.05 to about 5 weight percent.

34. The waterborne surface coating defined in claim 19 wherein the concentration of salt in said sol or gel composition is about 10 to about 20 weight percent.

35. The waterborne surface coating defined in claim 19 wherein the concentration of sol or gel composition in said coating composition is about 0.1 to about 2 weight percent.

36. The waterborne surface coating defined in claim 19 wherein the concentration of sol or gel in said product admixture composition is about 2 to about 20 weight percent.

37. The waterborne surface coating composition defined in claim 19 wherein said latex of a polymer selected from the polymer group consisting of
   (1) conjugated diolefin polymers containing one or more conjugated diene monomers having 4 to 8 carbon atoms,
   (2) olefin-ester interpolymers containing a monoolefin monomer having up to 4 carbon atoms and an alkenyl or alkenol ester of a saturated carboxylic acid,
   (3) olefinically unsaturated carboxylic acid ester polymers containing polymerized, olefinically unsaturated monomers containing polymerized olefinically unsaturated carboxylic acid ester monomers,
   (4) polymers of olefinically unsaturated monomers containing alkenyl ether monomer units,
   (5) polymers of vinylidene chloride or vinyl chloride with or without other polymerized, olefinically unsaturated monomers, and
   (6) combinations thereof.

38. The waterborne surface coating composition defined in claim 19 wherein said salt is selected from the group consisting of the acetates, citrates, nitrates and halides of ammonium, silver, aluminum, boron, calcium, cadmium, cerium, cobalt, chromium, cesium, copper, dyprosium, europium, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, yttrium, bismuth, gallium, neodymium, rubidium and terbium.

39. A paint composition comprising: a paint paste stock containing one or more components selected from the group consisting of a pigment, an extender pigment, a coalescing aid, a thickening aid, a dispersing aid, a protective colloid, a defoamer, a biocide, an amine solubilizer, a flow additive, a drier, a cosolvent and a filler material, a latex of a polymer and a gloss-enhancing amount of a salt in the form of anions, cations and colloidal salt particulates derived from a salt-containing sol or gel composition having a pH less than about 4.0.

40. A paint composition comprising: water a latex of a polymer a coalescing aid, a thickening aid, a defoamer, a biocide, a filler, and a gloss-enhancing amount of a salt comprising anions, cations colloidal salt particulates homogeneously distributed in said composition.

41. A precursor composition useful for preparing a product surface coating composition, said precursor composition comprising:
   (1) a latex of a polymer,
   (2) a surface coating paste stock, and
   (3) a sol or gel composition containing a gloss-enhancing amount of a salt, said sol or gel further comprising anions, cations and colloidal salt particulates, an organic solvent and a stabilizer and having a pH less than about 4.0.

42. The precursor composition defined in claim 41 wherein said salt is in sufficient amount to increase the specular gloss of said product surface coating composition by at least about 2 percent reflectance, based upon light having about a 60° angle of incidence, as compared to said product surface coating composition without said salt.

43. The precursor composition defined in claim 39 wherein said salt is in sufficient amount to increase the specular gloss of said product surface coating composition by at least about 2 percent reflectance, based upon light having about a 60° angle of incidence, as compared to said product surface coating composition without said salt.

44. The precursor composition defined in claim 40 wherein said salt is in sufficient amount to increase the specular gloss of said product surface coating composition by at least about 2 percent reflectance, based upon light having about a 60° angle of incidence, as compared to said product surface coating composition without said salt.

45. A method for increasing the gloss property of a product surface coating composition, said method comprising the step of admixing a sol or gel composition containing a gloss-enhancing concentration of a salt in the form of anions, cations and colloidal salt particulates with a composition containing a polymer to produce a product surface coating composition or a surface coating precursor composition, said product surface coating composition or a product surface coating composition derived from said surface coating precursor composition both having a gloss property which is greater than that of the same product surface coating composition prepared without said salt from said sol or gel composition.

46. The method defined in claim 45 wherein the specular gloss of said product surface coating is increased by at least about 2 percent reflectance, based upon light having about a 60° angle of incidence.

47. The method defined in claim 45 wherein said product surface coating composition is a semi-gloss or high-gloss paint.

48. The method defined in claim 45 wherein said product surface coating composition or said surface coating precursor composition comprises a latex polymer and said salt comprises a rare earth metal.

49. A method for enhancing the gloss property of a product paint composition, said method comprising the step of admixing a sol or gel composition containing a salt in the form of anions, cations and colloidal salt particulates with a paint composition or a paint precursor composition, said paint composition, product paint composition or paint precursor composition each containing a polymer.

50. The method defined in claim 49 wherein said product surface coating composition comprises a latex of a polymer selected from the polymer group consisting of
  (1) conjugated diolefin polymers containing one or more conjugated diene monomers having 4 to 8 carbon atoms,
  (2) olefin-ester interpolymers containing a monoolefin monomer having up to 4 carbon atoms and an alkenyl or alkenol ester of a saturated carboxylic acid,
  (3) olefinically unsaturated carboxylic acid ester polymers containing polymerized, olefinically unsaturated monomers containing polymerized olefinically unsaturated carboxylic acid ester monomers,
  (4) polymers of olefinically unsaturated monomers containing alkenyl ether monomer units,
  (5) polymers of vinylidene chloride or vinyl chloride with or without other polymerized, olefinically unsaturated monomers, and
  (6) combinations thereof.

51. The method defined in claim 45 wherein said salt is selected from the group consisting of the acetates, citrates, nitrates and halides of ammonium, silver, aluminum, boron, calcium, cadmium, cerium, cobalt, chromium, cesium, copper, dyprosium, europium, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, yttrium, bismuth, gallium, neodymium, rubidium and terbium.

52. The method defined in claim 45 wherein said salt comprises lanthanum or silicon.

53. The method defined in claim 45 wherein said salt comprises a rare earth metallic cation.

54. The method defined in claim 45 wherein said finished paint composition comprises:
  (a) a coalescing aid,
  (b) a thickening aid,
  (c) a dispersing aid,
  (d) a defoamer,
  (e) a biocide,
  (f) a filler, and
  (g) a polymer binder.

55. The method defined in claim 45 wherein said surface coating composition or surface coating precursor composition comprises a latex of a polymer and said sol or gel composition has a pH less than about 4.0.

56. The method defined in claim 45 wherein said salt contained in said composition containing said polymer is homogeneously distributed with said polymer.

57. The method defined in claim 45 wherein the concentration of said sol or gel composition in said product surface coating composition is about 0.1 to about 2 weight percent.

58. The method defined in claim 49 wherein the specular gloss of the product paint composition is increased at least about 2 percent reflectance, based upon light having about a 60° angle of incidence, compared to said product paint composition without said salt.

59. The method defined in claim 49 wherein said product paint composition is a semi-gloss or high-gloss paint.

60. The method defined in claim 49 wherein said product paint composition is a semi-gloss paint.

61. The method defined in claim 49 wherein said starting paint or paint precursor composition comprises a latex polymer and said salt comprises a rare earth metal.

62. The method defined in claim 49 wherein said salt in said sol or gel composition comprises colloidal salt particulates.

63. The method defined in claim 49 wherein said product paint composition comprises a latex of a polymer selected from the polymer group consisting of
  (1) conjugated diolefin polymers containing one or more conjugated diene monomers having 4 to 8 carbon atoms,
  (2) olefin-ester interpolymers containing a monoolefin monomer having up to 4 carbon atoms and an alkenyl or alkenol ester of a saturated carboxylic acid,
  (3) olefinically unsaturated carboxylic acid ester polymers containing polymerized, olefinically unsaturated monomers containing polymerized olefinically unsaturated carboxylic acid ester monomers,
  (4) polymers of olefinically unsaturated monomers containing alkenyl ether monomer units,
  (5) polymers of vinylidene chloride or vinyl chloride with or without other polymerized, olefinically unsaturated monomers, and
  (6) combinations thereof.

64. The method defined in claim 49 wherein said salt is homogeneously distributed with the polymer contained in said paint composition or said paint precursor composition.

65. The method defined in claim 49 wherein said salt is selected from the group consisting of the acetates, citrates, nitrates and halides of ammonium, silver, aluminum, boron, calcium, cadmium, cerium, cobalt, chromium, cesium, copper, dyprosium, europium, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, yttrium, bismuth, gallium, neodymium, rubidium and terbium.

66. The method defined in claim 49 wherein said salt comprises lanthanum or silicon.

67. The method defined in claim 49 wherein said salt comprises a rare earth metallic cation.

68. The method defined in claim 49 wherein said product paint composition comprises:
   (a) a coalescing aid,
   (b) a thickening aid,
   (c) a dispersing aid,
   (d) a defoamer,
   (e) a biocide, and
   (f) a filler.

69. The method defined in claim 49 wherein said paint composition or paint precursor composition comprises a latex of a polymer and said sol or gel composition having a pH less than about 4.0.

70. The method defined in claim 49 wherein said salt contained in said product paint composition is homogeneously dispersed with said polymer.

71. The method defined in claim 49 wherein the concentration of said sol or gel composition in said product paint composition is about 0.1 to about 2 weight percent.

72. The method defined in claim 49 wherein the concentration of said salt in said product paint composition is about 0.05 to about 5 weight percent.

73. The method defined in claim 49 wherein the concentration of salt in said sol or gel composition is about 2 to about 50 weight percent.

74. The method defined in claim 68 wherein said polymer is a binder comprising a latex polymer.

75. The method defined in claim 49 wherein sufficient salt is contained in said sol or gel composition to increase the specular gloss of said product paint composition by at least about 2 percent reflectance, based upon light having about a 60° angle of incidence, as compared to said product paint composition not containing said sol or gel composition.

76. A method for enhancing the gloss of a surface coating composition, said method comprising the following steps:
   (a) admixing a sol or gel composition containing a salt and having a pH less than about 4.0 with a composition containing a latex of a polymer to produce a product admixture composition containing said salt and said latex of a polymer; and
   (b) blending said product admixture composition with a surface coating paste stock containing one or more components selected from the group consisting of a pigment, an extender pigment, a coalescing aid, a thickening aid, a dispersing aid, a protective colloid, a defoamer, a biocide, an amine solubilizer, a flow additive, a drier, a cosolvent and a filler material, to produce a surface coating composition having a specular gloss which is greater by at least about 2 percent reflectance, based upon light having about 60° angle of incidence, than substantially the same surface coating composition but not containing said sol or gel composition.

77. The method defined in claim 76 wherein said salt in said product admixture composition comprises colloidal salt particulates.

78. The method defined in claim 76 wherein said polymer composition comprises a starting latex polymer.

79. The method defined in claim 76 wherein said polymer composition comprises water.

80. The method defined in claim 76 wherein said surfacing coating paste stock comprises at least one pigment.

81. The method defined in claim 76 wherein said surface coating composition is a semi-gloss or high-gloss paint.

82. The method defined in claim 76 wherein sufficient salt is added to said sol or gel composition to increase said specular gloss by at least about 2.5 percent reflectance.

83. The method defined in claim 76 wherein said polymer in step (a) is selected from the polymer group consisting of
   (1) conjugated diolefin polymers containing one or more conjugated diene monomers having 4 to 8 carbon atoms,
   (2) olefin-ester interpolymers containing a monoolefin monomer having up to 4 carbon atoms and an alkenyl or alkenol ester of a saturated carboxylic acid,
   (3) olefinically unsaturated carboxylic acid ester polymers containing polymerized, olefinically unsaturated monomers containing polymerized olefinically unsaturated carboxylic acid ester monomers,
   (4) polymers of olefinically unsaturated monomers containing alkenyl ether monomer units,
   (5) polymers of vinylidene chloride or vinyl chloride with or without other polymerized, olefinically unsaturated monomers, and
   (6) combinations thereof.

84. A product surface coating composition prepared by the method of claim 45.

85. A product paint composition prepared by the method of claim 49.

86. A product surface coating composition prepared by the method of claim 76.

87. A surface coating composition prepared by the method comprising the steps of:
   (1) admixing a composition containing a latex of a polymer with a surface coating paste stock containing one or more components selected from the group consisting of a pigment, an extender pigment, a coalescing aid, a thickening aid, a dispersing aid, a protective colloid, a defoamer, a biocide, an amine solubilizer, a flow additive, a drier, a cosolvent and a filler material, and
   (2) admixing a sol or gel composition containing a salt in the form of cations, anions, and colloidal salt particulates with the admixture composition obtained from step (1) to product a surface coating composition containing said salt in a sufficient amount to enhance the gloss property of said surface coating composition.

88. A surface coating composition prepared by the method comprising the steps of:
   (1) admixing a surface coating paste stock containing one or more components selected from the group consisting of a pigment, an extender pigment, a coalescing aid, a thickening aid, a dispersing aid, a protective colloid, a defoamer, a biocide, an amine solubilizer, a flow additive, a drier, a cosolvent and a filler material with a sol or gel composition containing a salt in the form of cations, anions and colloidal salt particulates, said salt in sufficient amount to enhance gloss on a substrate when coated on said substrate and
   (2) admixing a composition containing a latex of a polymer with an admixture composition obtained from step (1) to produce a surface coating composition having enhanced gloss properties compared to the same surface coating composition which does not containing said sol or gel composition.

89. A surface coating composition comprising:
(A) a surface coating paste stock containing one or more components selected from the group consisting of a pigment, an extender pigment, a coalescing aid, a thickening aid, a dispersing aid, a protective colloid, a defoamer, a biocide, an amine solubilizer, a flow additive, a drier, a cosolvent, and a filler material,
(B) a latex of a polymer,
(C) a sol or gel composition having a pH less than about 4.0 and comprising
  (1) a stabilizer comprising a chelator or a nonionic surfactant,
  (2) a nonaqueous solvent comprising an ether, ester, alcohol or combination thereof,
  (3) at least one salt comprising anions, cations or colloidal particulates, said salt in sufficient amount to enhance the gloss property of said composition when coated on a substrate, and
(D) water.

90. The surface coating composition defined in claim 89 comprising at least about 15 weight percent of water.

91. The surface coating composition defined in claim 89 wherein said chelator comprises citric acid and said nonaqueous solvent comprises ethylene glycol.

92. The surface coating composition defined in claim 89 wherein said salt is selected from the group consisting of the acetates, citrates, nitrates and halides of ammonium, silver, aluminum, boron, calcium, cadmium, cerium, cobalt, chromium, cesium, copper, dyprosium, europium, iron, mercury, indium, potassium, lanthanum, lithium, magnesium, sodium, nickel, lead, praseodymium, antimony, silicon, strontium, thallium, uranium, zinc, manganese, gold, germanium, molybdenum, samarium, tellurium, yttrium, bismuth, gallium, neodymium, rubidium and terbium.

93. The composition defined in claim 3 wherein said salt comprises lanthanum nitrate and said polymer binder comprises a vinyl acrylic latex.

94. The composition defined in claim 39 wherein said polymer comprises about 40 to about 70 weight percent of said latex.

95. The composition defined in claim 39 wherein said sol or gel composition comprises a nonaqueous solvent and a stabilizer.

96. The composition defined in claim 39 wherein said salt comprises at least one lanthanum-containing salt or silicon-containing salt.

97. The composition defined in claim 87 wherein said polymer in step (1) is contained in said latex in a concentration from about 40 to about 70 weight percent.

98. The composition defined in claim 88 wherein said polymer in step (2) is contained in said latex in a concentration from about 40 to about 70 weight percent.

99. The composition defined in claim 89 wherein said latex comprises about 40 to about 70 weight percent of said polymer.

100. The composition defined in claim 3 wherein said salt comprises at least one lanthanum-containing salt or silicon-containing salt.

101. The composition defined in claim 22 wherein said salt comprises at least one lanthanum-containing salt or silicon-containing salt.

102. The composition defined in claim 89 wherein said salt comprises at least one lanthanum-containing salt or silicon-containing salt.

* * * * *